United States Patent [19]

Hamrick

[11] Patent Number: 5,341,637

[45] Date of Patent: Aug. 30, 1994

[54] SYSTEM FOR BURNING BIOMASS TO FUEL A GAS TURBINE

[76] Inventor: Joseph T. Hamrick, 4353 Wendy Gap Dr., Roanoke, Va. 24014

[21] Appl. No.: 994,720

[22] Filed: Dec. 22, 1992

[51] Int. Cl.5 .............................................. F02C 3/26
[52] U.S. Cl. .................. 60/39.464; 110/102; 110/233
[58] Field of Search .............. 60/39.464; 110/102, 110/233

[56] References Cited

U.S. PATENT DOCUMENTS

| 2,509,246 | 5/1950 | Ramsey | 60/39.464 |
| 2,735,266 | 2/1956 | Atherton | 60/39.464 |
| 4,409,786 | 10/1983 | Hamrick | 60/39.464 |

FOREIGN PATENT DOCUMENTS 8600375  1/1986  PCT Int'l Appl. .............. 60/39.464

OTHER PUBLICATIONS

"Biomass Fueled Gas Turbine Development" by Joseph T. Hamrick Aug. 29, 1991.

"Development of Biomass as an Alternative Fuel for Gas Turbines" by J. T. Hamrick, Apr. 1991.

Primary Examiner—Richard A. Bertsch
Assistant Examiner—W. J. Wicker
Attorney, Agent, or Firm—Pitts & Brittian

[57] ABSTRACT

A system for burning biomass to fuel a gas turbine 10 which generally comprises a pressurized combustion chamber 54, a feeder device 14 for feeding biomass particles into the combustion chamber 54, an air compressor 82 for supplying compressed air to the combustion chamber 54, an ash extracting device 92 for removing ash from the combustion gases 75, a turbine 116 and a central controller 126 for monitoring and controlling various aspects of the system 10. The biomass is fed into the combustion chamber 54 where the particles combust and produce highly pressurized combustion gases 75. The ash extracting device 92 removes the ash in the combustion gases 75 before the combustion gases 75 enter the turbine 116. The highly pressurized combustion gases 75 enter the turbine 116 where they expand to produce work and cause the blades of the turbine 116 to rotate. The turbine 116 drives an electric generator which is linked to a power transmission line through any suitable switching gear.

18 Claims, 7 Drawing Sheets

SYSTEM FOR BURNING BIOMASS TO FUEL A GAS TURBINE

FIELD OF INVENTION

This invention relates to a gas turbine power generating system and, in particular, to a system which utilizes the gases resulting from the combustion of biomass to fuel the turbine.

BACKGROUND OF THE INVENTION

During the past decade developing alternative sources of fuel has become an increasing concern for both environmental and economical reasons. Fossil fuels are the traditional source for fueling gas turbine power generating systems. Sources for fossil fuels are becoming scarce and expensive, and concern has arisen about the environmental impact the byproducts of processing these fuels have.

In general, an electric power producing turbine system includes an air compressor, a combustion chamber for burning fuel in the presence of the compressed air, a turbine into which the high pressure combustion gases are flowed to expand and produce power, and an electric generator which is powered by the turbine.

In an effort to solve the problems of fossil fueled power plants, research has been conducted in using biomass to fuel a turbine system. Wood, in the form of saw dust, and sugar cane bagasse have proven to be viable options for fueling turbine systems. Wood and sugar cane are renewable fuels and the burning of these fuels does not have the negative environmental impact which the traditional fossil fuels have.

In developing a system for burning biomass several problems must be overcome. Biomass of the types mentioned above have a much higher combustion temperature than traditional fuels. The combustion chamber must be constructed to withstand such high heats associated with burning these fuels. Controls and sensors must be located throughout the system to avoid serious damage to the entire system from overheating. Because the combustion chamber is both pressurized and maintained at a high temperature, special attention must be paid to how the biomass is fed into the combustion chamber. The feeder system must be able to transport the wood particles from a zone of low pressure to a zone of high pressure while supplying means to protect the feeder system from the high temperature of the combustion chamber.

Another problem associated with utilizing biomass as a fuel is that one of the byproducts of burning biomass is ash. If the ash is not removed before the combustion gases enter the turbine, the ash will adhere to the turbine blades and clog the system, seriously degrading the performance of the system and damaging the turbine. Removal of all of the ash is extremely difficult, therefore, other actions must be taken to prevent the remaining ash from adhering to the turbine blades.

An additional concern is the life of the turbine blades. To extend the life of the turbine, the temperature of the combustion gases entering the turbine must be controlled. Because the turbine inlet temperature must be controlled or limited a flow enhancer must be utilized to attain the power output needed.

A final concern is the sudden loss of load which occurs when there is a disconnection of the electrical generator from a power distribution grid. A load replacement device must be incorporated into the system to avoid the overspinning of the turbine.

U.S. Pat. No. 4,409,786 discloses a wood burning system and method. The system and method discussed in this patent does not approach the problems that occur with a system to be used commercially. In the wood burning system discussed there are no means to control the pressure in the combustion chamber to avoid overheating of the system. The temperature of the gases exiting the combustion chamber is not cooled to a point that the remainder of the system can tolerate. The patent does approach the problem of the removal of ash but assumes that all ash will be extracted from the combustion gases, which is not the case. No supplemental methods are provided for dealing with the ash remaining in the combustion gases. The life of the turbine is a major concern for a system to be used for an extended amount of time. To extend the turbine life the temperature of the gases entering the turbine must be controlled which means power output is sacrificed. No solutions are provided for retaining a certain amount of power output when the inlet turbine temperatures are limited. Another concern is the loss of load due to a disconnect from the outside facility. The system discussed in the patent does not approach the problem of preventing the turbine from overspeeding due to loss of load. Finally, a central control system is necessary to monitor and control critical aspects of the system while operating. A central control system is not discussed or presented in the '796 patent.

Therefore, it is an object of this invention to provide a system for burning biomass to fuel a gas turbine which provides a means to control the pressure in the pressurized combustion chamber.

It is a further object of this invention to provide such a system which provides a means to cool the temperature of the combustion gases exiting the combustion chamber.

It is yet a further object of this invention to provide such a system in which the ash of the combustion gases does not adhere to the turbine blades.

It is still a further object of this invention to provide such a system where a flow enhancer is utilized to increase the energy required to power the system.

A further object of this invention is to provide such a system where a load replacement device is incorporated to absorb the load of the system when the outside load is suddenly disconnected.

It is yet a further object of this invention to provide such a system that incorporates a central control system to monitor and control the system.

DISCLOSURE OF THE INVENTION

In accordance with the present invention, a system for burning biomass to fuel a gas turbine is provided. The system includes a pressurized combustion chamber, a feeder system for feeding biomass into the pressurized combustion chamber, an air compressor which supplies air to the combustion chamber, an ash extractor, a turbine and a central controller for monitoring and controlling the system.

The combustion chamber is comprised of a primary and a secondary combustor. The biomass, wood particles in the preferred embodiment, is fed into the combustion chamber via a feeder system. In the preferred embodiment, the feeder system is comprised of a live bottom control bin, a settling chamber and a rotary valve unit, which comprises of a plurality of pressure sealed rotary valves and a heat isolation rotary valve. The live bottom control bin feeds the biomass into the settling chamber, which in turn feeds into the rotary valves. The rotary valves transport the biomass from a zone of low pressure to a zone of high pressure and feeds the biomass into the combustion chamber in a continuous manner.

The biomass is fed directly into the primary combustor where the majority of the biomass will combust. Air from the compressor is ducted into the primary combustor to facilitate the combustion of the biomass. Buffer air is injected into the passage between the combustion zone and the heat isolation rotary valve to disperse the biomass and cool the passage such that the rotary valve does not get damaged. The biomass that does not combust in the primary combustor will be forced to the wall of the secondary combustor where combustion will take place. The combustion gases are cooled to about 1700° F. before exiting the combustion chamber.

The combustion gases are ducted into the ash extractor where the ash in the combustion gases is separated and removed. Subsequently, the clean gases are ducted to the turbine system, which is comprised of the air compressor, a gas turbine which powers the air compressor and a power turbine which powers an electric generator. The combustion gases enter the gas turbine and the power turbine where they expand to produce work. The power turbine powers an electric generator which supplies power to an outside power distribution grid. The power in excess of that required for the power distribution grid is used to power the system including the feeder system, the rotary valves and the central controller.

A flow enhancer is injected into the combustion gases before the gases enter the turbine to enhance the flow of the gases through the turbines to increase the power output of the turbines.

An additive is utilized which serves to prevent ash that is not removed from the combustion gases from adhering to the turbine blades.

A central control system is incorporated into the system to start, monitor and control the system. Located in the central control are means to control the feed rate of biomass, means to control the pressure in the combustion chamber, means to control the inlet turbine temperature, a switching element transfers the system to a load absorber in the case that the outside load is disconnected, and means to control the start up of the system and to switch off commercial power when the system is generating enough power to run on its own.

BRIEF DESCRIPTION OF THE DRAWINGS

The above mentioned features of the invention will become more clearly understood from the following detailed description of the invention read together with the drawings in which.

PREFERRED EMBODIMENT OF THE INVENTION

Figure 1A:
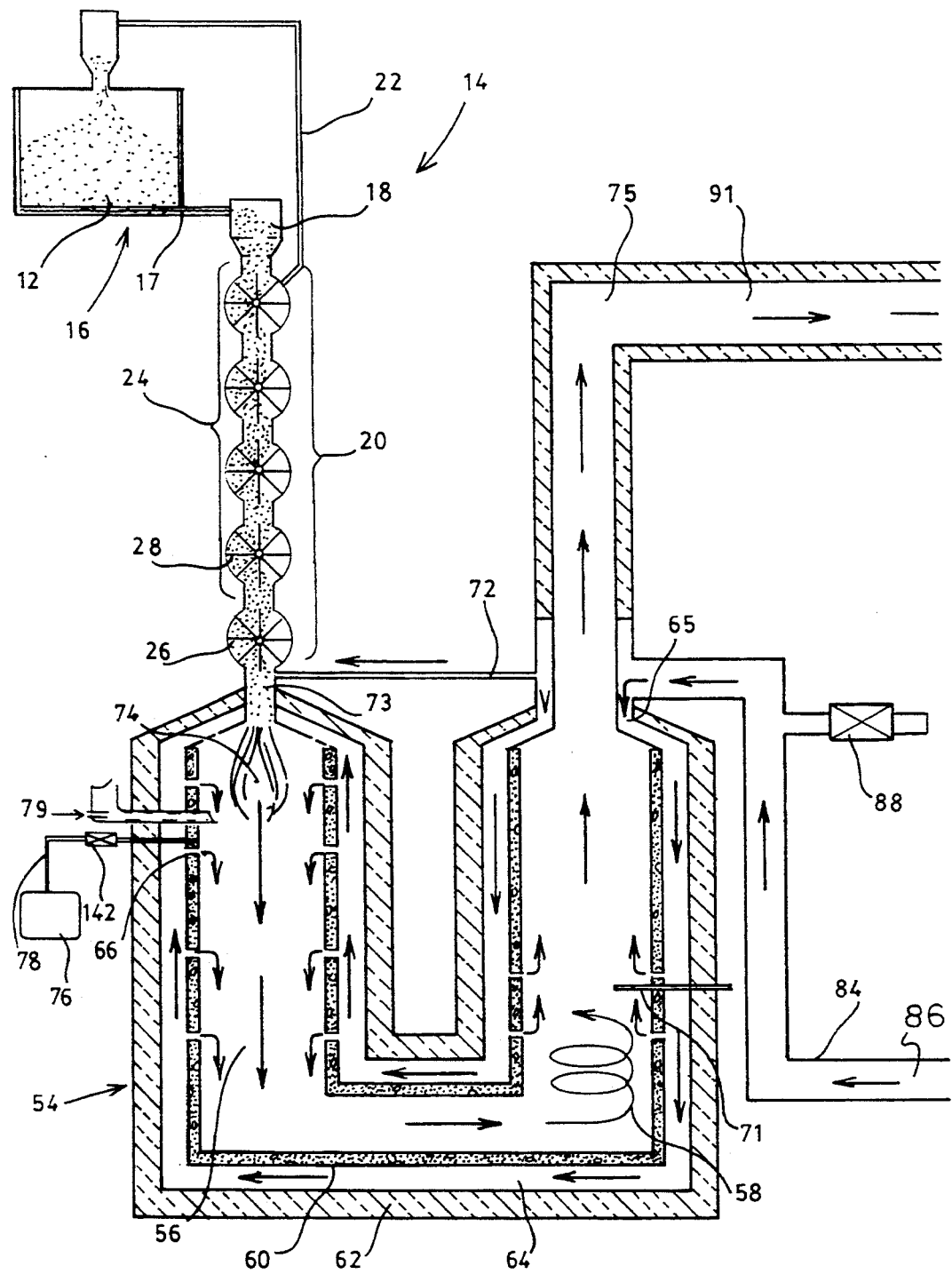
FIGS. 1A and 1B are a schematic of the system for burning biomass to fuel a gas turbine.
Figure 1B:
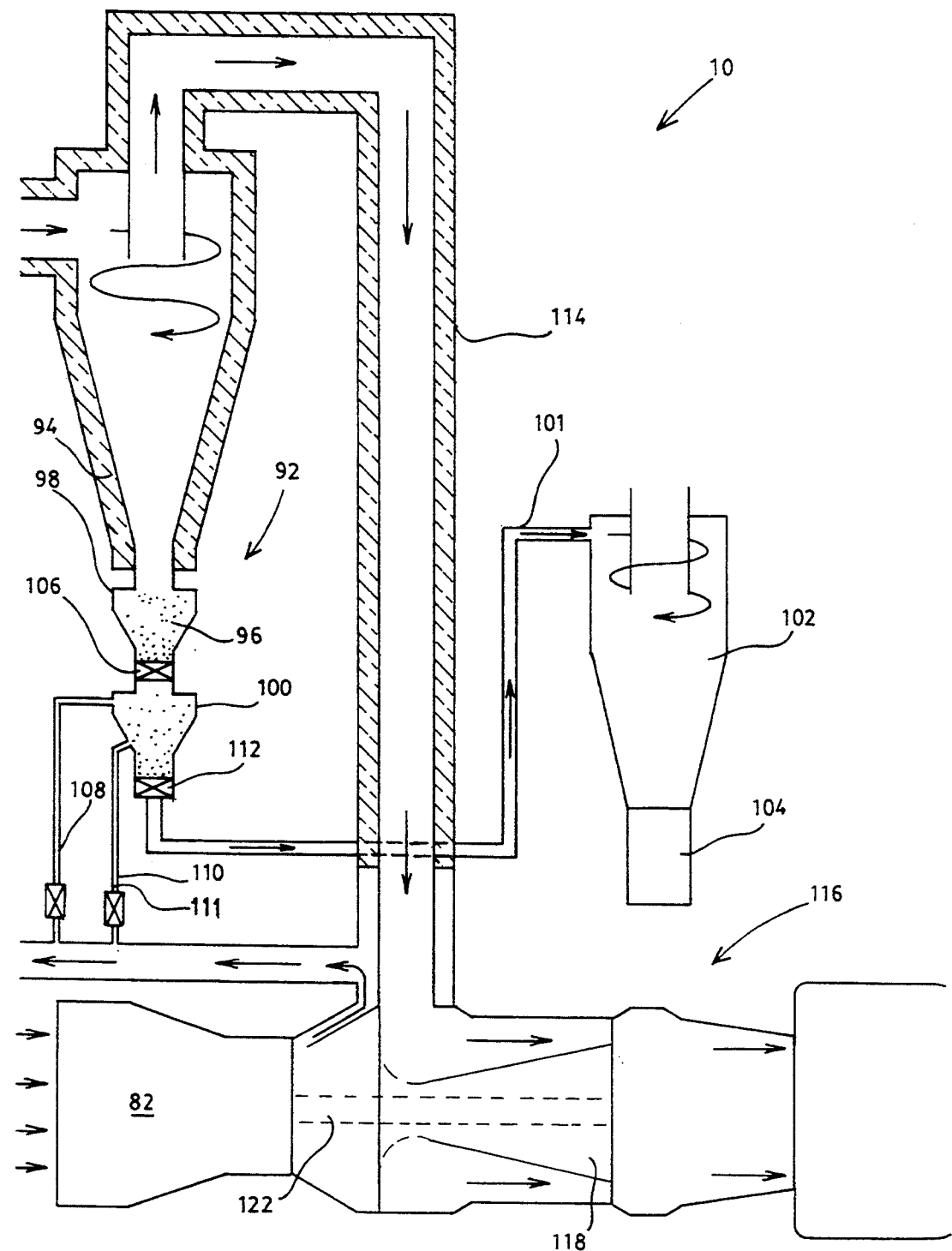

A system for burning biomass particles to fuel a gas turbine incorporating various features of the present invention is illustrated generally at 10 in FIGS. 1A and 1B. In the preferred embodiment the system is set up to burn wood particles 12, but it should be noted by those skilled in the art that, with minor alterations to the system, other biomass sources can be utilized.

The system is comprised, in general, of a pressurized combustion chamber 54, a feeder device 14 for feeding the biomass particles into the combustion chamber 54, an air compressor 82 for supplying compressed air 86 to the combustion chamber 54, an ash extracting device 92 for removing ash from the combustion gases 75, a turbine 116 and a central controller 126 for starting, monitoring and controlling various aspects of the system 10. These components are described in greater detail hereinafter.

In the preferred embodiment, wood is the biomass source. The wood preferably is reduced to a particle size to pass through a ¼ inch screen and dried to 20–25 percent moisture. The wood can be reduced via any acceptable means to the size necessary. The particles 12 can be dried in any type of drier (not shown) that removes the desired amount of moisture content. In the preferred embodiment, the drier incorporates the heat from the exhaust gases to dry the wood particles 12. Secondary fuel can be comprised of wood chips dried to about 20–25 percent moisture and pulverized to pass through a ½ inch screen.

In the preferred embodiment, wood particles 12 are fed into the pressurized combustion chamber 54 via a vertical feeder device 14 comprised of a live bottom metering bin 16, a settling chamber 18 and a rotary valve unit 20. The feeder device 14 employs the rotary valve unit 20 to resolve the problems associated with the ignition of wood particles 12 upon shut down of the system. If the wood particles are fed directly from a pressurized bin into the combustion chamber 54, the wood particles 12 left in the pressurized bin on shutdown are likely to ignite. The rotary valve unit 20 can be cleared of wood particles 12 on shutdown and, therefore, can provide a fire screening buffer between the combustion chamber 54 and the metering bin 16. The wood particles 12 are fed into the live bottom metering bin 16 which empties into the settling chamber 18. In the preferred embodiment, the live bottom metering bin 16 has an archimedean screw 17 positioned at the bottom of the bin 16. The drive speed of the archimedean screw 17 controls the rate at which the particles discharge into the settling chamber 18. The settling chamber 18 empties into the first rotary valve 24 of the rotary valve unit 20. Preferably, a vent line 22 is used to relieve pressure in the first rotary valve 24 to prevent a flow of air through the settling chamber 18 such that the feed of wood particles 12 into the first rotary valve 24 of the rotary valve unit 20 is not interrupted.

There are two types of rotary valves in the rotary valve unit 20 used in the feeder device 14, pressure sealed rotary valves 24 and a heat isolation rotary valve 26. The heat isolation rotary valve 26 is situated between the pressure sealed rotary valves 24 and the pressurized combustion chamber 54 and serves to protect the seals 36, 44 of the pressure sealed rotary valves 24 from damage due to excessive heat from the combustion chamber 54.

The pressure sealed rotary valves 24 transport the wood particles 12 from a zone of low pressure to a zone of high pressure via the sealed chambers which are formed by the spring loaded barrel seal 36 and a set of spring loaded endplate seals 44 on each vane 28 of the rotary valves 24. The vanes 28 of the rotary valves in the unit 20 are fixedly attached to the shaft 34 of the rotary valves. The number of rotary valves in the rotary valve unit 20 needed to transport the particles 12 will depend upon the pressure in the combustion chamber 54. For optimum combustion of wood particles 12 in this system, the combustion chamber 54 is held at 100 to 200 pounds per square inch gage (psig). In the preferred embodiment, four pressure sealed rotary valves 24 and a heat isolation rotary valve 26 are utilized to attain the pressure differential.

To establish the pressure differential between the pressure sealed rotary valves 24, each of the radial vanes 28 of each pressure sealed rotary valve 24 is equipped with a spring loaded barrel seal 36 and a set of spring loaded endplate seals 44 on each side of each radial vane 28 to seal against the barrel 30 and the endplates 32 on each side of the rotary valves 24.

Figure 2:
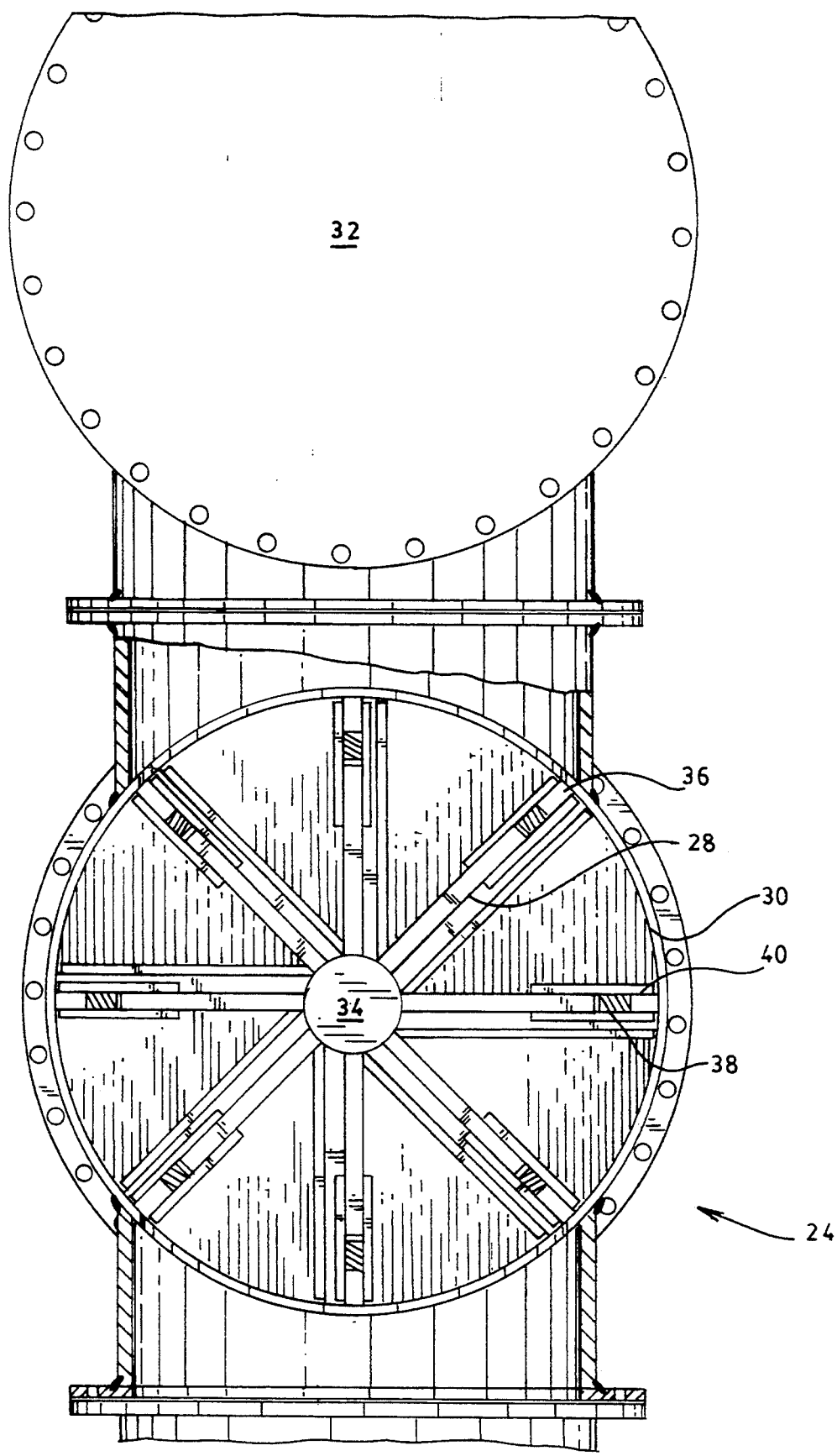
FIG. 2 is a perspective view of a rotary valve used in the system of FIGS. 1A and 1B.

A cross section of a pressure sealed rotary valve 24 is shown in FIG. 2. In choosing the seals incorporated into the pressure sealed rotary valves 24, one must consider the abrasiveness of the wood particles 12. When wood particles 12 gets trapped between a seal and a wall of rotary valve and there is no resilience in position between the two surfaces, one or both surfaces will be damaged by abrasion, and subsequently the seal will be destroyed. In the feeder device 14 discussed above each radial vane 28 of the pressure sealed rotary valves 24 is equipped with a spring loaded barrel seal 36 and a set of spring loaded endplate seals 44 such that the radial vane 28 seals against the barrel 30 and both endplates 32 of the rotary valves 24. The seal yields to trapped wood particles 12 such that the particles 12 can move out without damaging the barrel seals 36 and endplate seals 44. The seals 36, 44 are fabricated from an inert nonreactive material such as nylon or glass filled teflon. In the preferred embodiment, the seals 36, 44 are fabricated from nylon.

Figure 3:
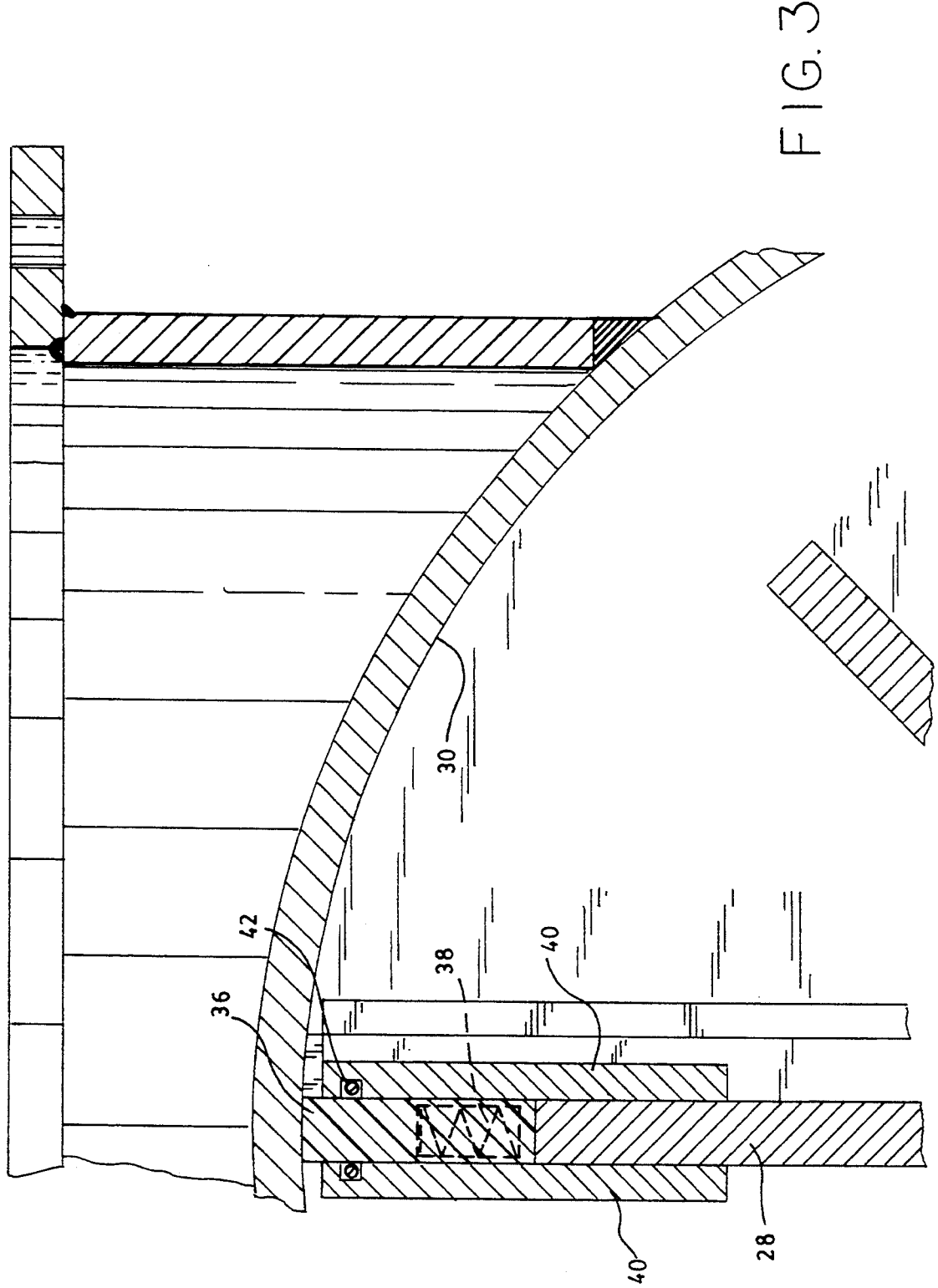
FIG. 3 is a cross sectional view of the barrel seal on the radial vane of a pressure sealed rotary valve for use in the system of FIGS. 1A and 1B.

A cross sectional view of the barrel seal 36 is shown in FIG. 3. The barrel seal 36 is held in contact with the barrel 30 by the barrel seal springs 38. The barrel seal 36 is held in place by the barrel seal guides 40 and sealed to the barrel seal guides 40 with an inner seal 42. The barrel seal 36 is held in place such that its motion is substantially in upward and downward direction, indicated by the arrow 43.

Figure 4:
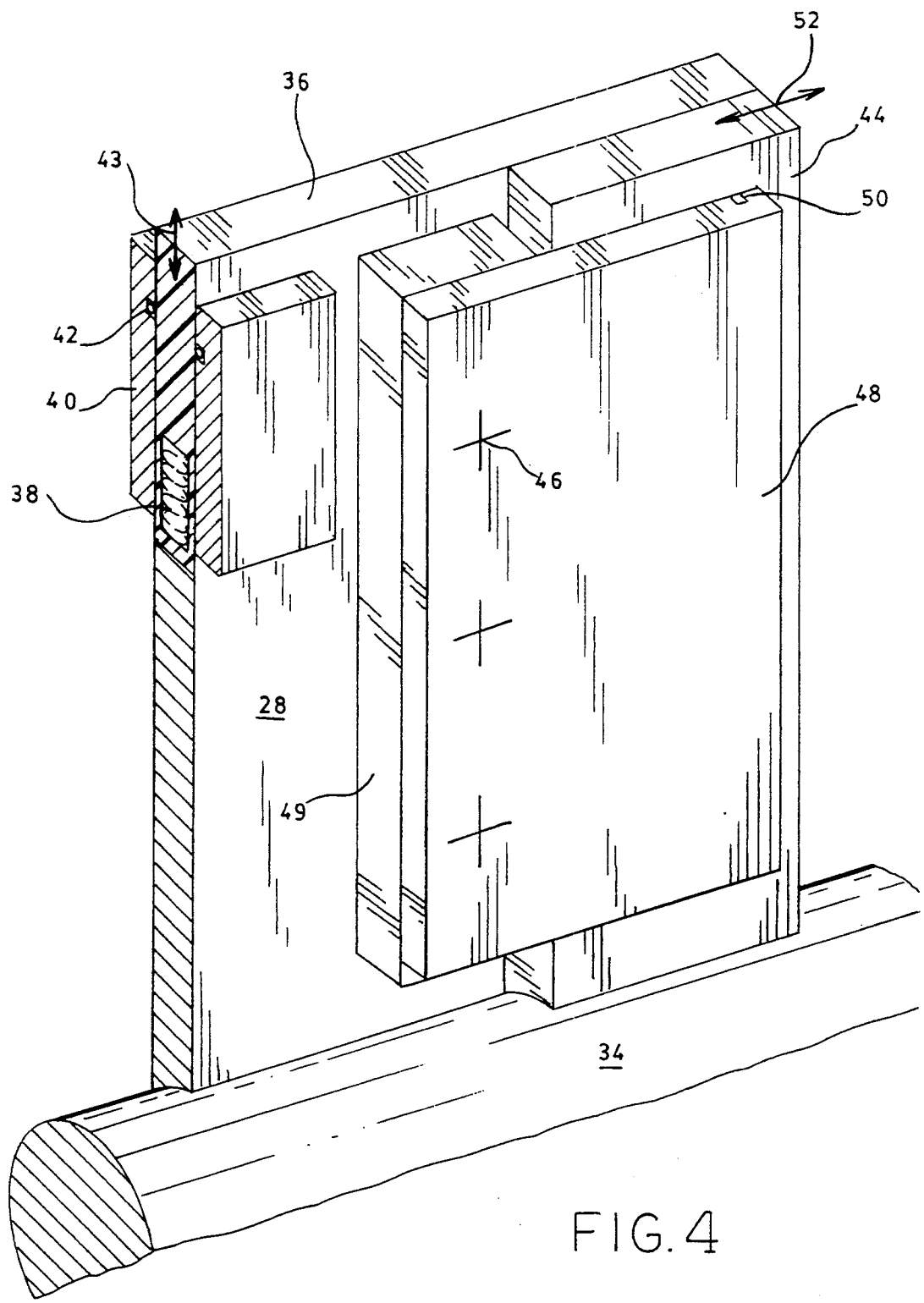
FIG. 4 is a partial perspective view of a radial vane of pressure sealed rotary valve of FIG. 3.

A portion of a vane 28 with a barrel seal 36 and an endplate seal 44 is shown in FIG. 4. The endplate seal 44 is similar to the barrel seal 36 in that endplate seal 44 is held in contact with the endplate 32 by the endplate seal springs 46. The endplate seal 44 is held in place by a single endplate guide 48, which is supported by a stage 49, and a second inner seal 50. This endplate seal 44 is incorporated on both sides of the radial vane 28. The endplate seal 44 is held in place such that it moves in a direction as indicated by the arrow 52. To seal at the corners the barrel seal 36 and the endplate seal 44 lay flat against each other. The barrel seal 36 and each endplate seal 44 are independent of each other in their motions.

The wood particles 12 pass through the heat isolation rotary valve 26 into the combustion chamber 54. The combustion chamber 54 is comprised of a primary combustor 56 and a secondary combustor 58, as shown in FIGS. 1A and 1B. The combustion chamber 54 is constructed such that there is an inner wall 60 and an outer wall 62, and between the inner wall 60 and outer wall 62 is an annulus 64. In the preferred embodiment, the outer wall 62 is constructed of a high temperature blanket insulation, and the inner wall 60 is fabricated from a firebrick with a high content of alumina.

The air compressor 82, which is powered by the gas generator turbine 118, forces air 86 through a conduit 84 and into the combustion chamber 54 through a port 65 at the top of the secondary combustor 58 of the combustion chamber 54. The maximum temperature of the air 86 leaving the compressor 82 is approximately 600° F. The air 86 flows around the outside of the inner wall 60 within the annulus 64 to enter the primary combustor 56 through the primary combustor ports 66 in the inner wall 60 of the combustion chamber 54. The flow of the compressor air 86 through the annulus 64 cools the firebrick, increasing the life of the firebrick. As the compressor air 86 travels through the annulus, it absorbs heat from the inner wall such that upon entering the primary combustor 56 the compressor air 86 temperature is approximately one half the temperature in the primary combustor 56. A conduit leading from the top of the secondary combustor 58 to the top of the primary combustor 56 serves to supply buffer air 72 to the passage 73 between the heat isolation rotary valve 26 and the primary combustor 56. This buffer air 72 is utilized to disperse and swirl the wood particles 12, such that the particles will burn more efficiently, and to cool the passage 73 such that the rotary valve 26 does not get damaged.

The primary combustor 56 supplies the location for primary combustion of the wood particles 12. The temperature in the primary combustion zone 74 can range up to 3000° F. As the wood particles 12 enter this zone the heat is such that the majority of the wood particles 12 will burn or combust.

The secondary combustor 58 serves several functions. It provides a location where the remaining unburned particles may combust before exiting the combustion chamber 54. As the unburned particles leave the primary combustor 56 and swirl into the secondary combustor 58, the particles centrifuge to the walls where they finish burning. In the preferred embodiment, water or steam is introduced at 71 to the combustion gases 75 in the secondary combustor 58 to enhance the flow of the combustion gases 75 through the turbine 116. The combustion gases 75 are also cooled in the secondary combustor 58 before exiting the combustion chamber 54. The gases are cooled to temperatures of about 1700° F. by flowing compressor air 86 through ports in the inner wall of the secondary combustor 58. The combustion gases 75 are cooled before exiting the combustion chamber 54 to the desired temperature of entry into the cyclone filter 94 and turbine vanes (not shown).

An initial heat up of the system is required to bring the primary combustion zone 74 up to combustion temperature. This is accomplished with the use of a liquid or gaseous warm up fuel with a low enough ignition temperature to start the system. The warm up fuel is held in the warm up fuel tank 76. It is injected into the primary combustor 56 as needed via the warm up fuel conduit 78 and ignited using spark electrodes 79. In the preferred embodiment, the warm up fuel is propane gas which is sparked to ignite. Wood particles 12 are fed into the combustion zone where they combust. To establish a flame pattern as rapidly as possible, the wood particles 12 fed into the combustion chamber 54 initially should contain about 20 percent moisture. Once the firebrick around the primary combustion zone 74 reaches 1100° F. to 1300° F., the outside warm up fuel supply is discontinued. The wood particles 12 subsequently fed into the combustion chamber 54 will burn at high heat release rates, and the temperature in the primary combustion zone 74 will be at least sufficient for combustion of the wood particles 12.

During the operation of the system there can be instances where the primary combustor 56 can overheat. The rate at which the wood particles 12 will burn, and thus the temperature in the combustion chamber 54, is controlled by the pressure in the combustion chamber 54 and the temperature in the combustion chamber 54. When the system overheats, a pressure dump valve 88 can be opened to dump the pressure in the combustion chamber 54. The pressure dump valve 88 is located in the conduit 84 leading from the compressor 82 to the combustion chamber 54. When the dump valve 88 is opened it will cause the pressure to drop significantly in the combustion chamber 54. This will cause the wood particles 12 to burn more slowly and in effect reduce the temperature in the combustion chamber 54 to an allowable range.

Upon exiting the combustion chamber 54, the combustion gases 75 are ducted from the combustion chamber 54 to the ash extracting device 92. Because of the high temperatures associated with the combustion gases 75, the duct 91 and the cyclone filter 94 of the ash extracting device 92, preferably, are lined with high temperature blanket insulation of the type that lines the combustion chamber 54 outer wall 62. The ash extracting device 92 serves to remove ash 96 from the combustion gases 75 while the system 10 is operating. The ash 96 is removed from the combustion gases 75 such that the ash 96 will not clog the turbine blades (not shown). In the preferred embodiment, the ash extracting device 92 is equipped with a cyclone filter 94, a primary 98 and a secondary ash lock hopper 100, a second cyclone filter 102 and an ash bin 104. As shown in FIG. 1, the ash 96 that is separated from the combustion gases 75 fall into the primary ash lock hopper 98. Upon opening the first discharge valve 106 between the primary and secondary ash lock hoppers 98, 100, the ash 96 is forced downward into the secondary ash lock hopper 100 after which the first discharge valve 106 is closed. Subsequently, the ash flush valve 108, the buffer air valve 110 and a second discharge valve 112 are opened which forces the ash 96 to exit the secondary ash lock hopper 100 through a pipe 101 and into a second cyclone filter 102, where the ash 96 is separated from the gases 75 and falls into the ash bin 104 for storage. The second discharge valve 112 and the ash flush valve 108 are closed allowing a pressurizing buffer air 111 to pressurize the secondary ash lock hopper 100 so as to prevent any leakage of hot gases 75 from the cyclone filter 94 through the discharge valve 106.

The cleaned combustion gases 75 are piped, via a second duct 114, from the top of the cyclone filter 94 into the turbine 116, which is comprised of a gas turbine 118 and a power turbine 120. In the preferred embodiment, the second duct 114 is also lined with high temperature blanket insulation.

The turbine 116 utilized in the system 10 is one in which the combustor can be offset from the compressor and the turbine. One such turbine is the General Electric LM2500 which can be modified for the connection of an offset combustor.

Upon entering the turbine 116, the high pressure combustion gases 75 expand to produce work. The gas turbine 118 powers the air compressor 82 via a drive shaft 122. The power turbine 120 drives an electrical generator 124. The generator 124 is in turn linked to a power transmission line (not shown) through any suitable switching gear (see FIG. 6). The power in excess of that required for the outside system is used to drive the biomass burning system 10, such as the feeder device 14 and the central controller 126. Waste heat and gases are used to generate steam and supply heat to the dryer (not shown) for drying the wood particles 12 before being burned.

Figure 5:
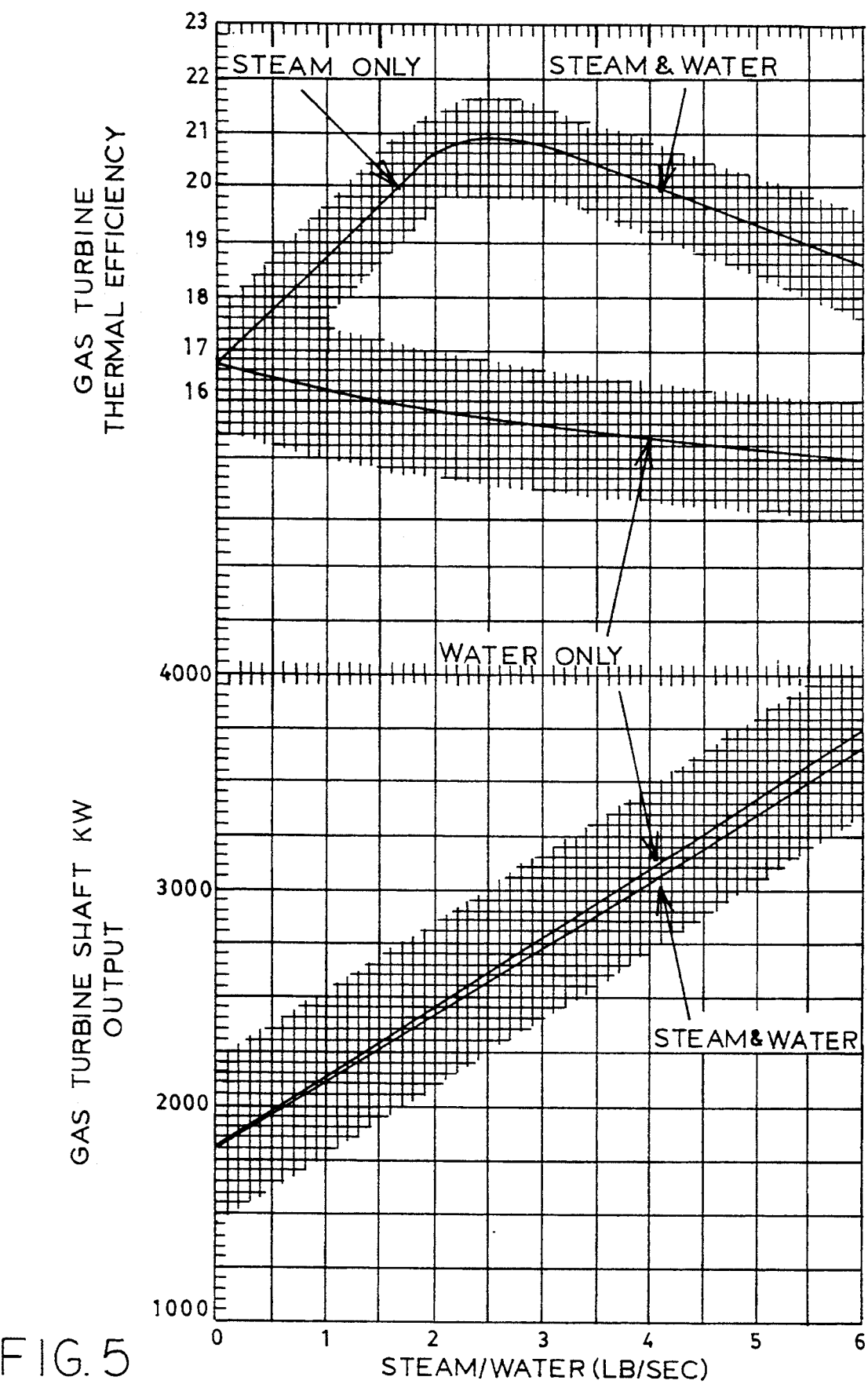
FIG. 5 is an analysis of the gas turbine performance with the injection of steam and water.

The turbine inlet temperature of the combustion gases 75 is controlled to range from 1350° F. to 1450° F. This is to extend the life of the turbine 116 and, in the absence of additives, to prevent the sintering of the deposits of inorganic constituents of the ash on the turbine blades (not shown). Limiting the temperature of the gases, however, reduces the power output of the turbine. To increase the flow of the combustion gases 75 through the turbine 116 at a specified temperature, water or steam can be injected into the hot combustion gases 75 during or at the end of the combustion process. Steam is the preferred medium and, in the preferred embodiment, is injected into the gases in the secondary combustor 58 via a steam injection head 71 which is turn connected to a waste heat boiler (not shown). Steam is preferred over water because all of the steam that is needed for injection into the hot gases can be produced by routing the exhaust gases through a waste heat boiler (not shown). FIG. 5 shows the effect of the injection of water and steam into the combustion gases 75. The use of water shows a degradation in the system's efficiency, while the use of steam shows an increase in the system's efficiency for the reasons stated above. FIG. 5 illustrates the increase in the turbine power output with the increasing amount of steam or water injected into the gases.

With the burning of biomass the deposits on the turbine blades can be extensive and adversely affect the system's power output. Several approaches can be taken to reduce the deposits on the turbine blades. One solution, as discussed above, is to reduce the temperature of the combustion gases 75 entering the turbine 116 to prevent sintering of the deposits on the turbine blades. This does not prevent the deposits but it does ease the removal of the deposits. To remove these deposits, milled apricot or walnut hulls can be run through the turbine 116 to remove the deposits. Another option is to mix a chemical additive up to one percent in the biomass which increases the melting temperature of the ash 96. The ash's melting temperature is elevated to a point above the turbine inlet temperature such that the byproducts will not be "tacky" and will not adhere to the turbine blades. In the preferred embodiment, the additive used is calcium hydroxide or 'slack lime'. The additive can be mixed with the biomass before combustion or injected into the combustion chamber 54. Powdered limestone is equally effective.

Figure 6:
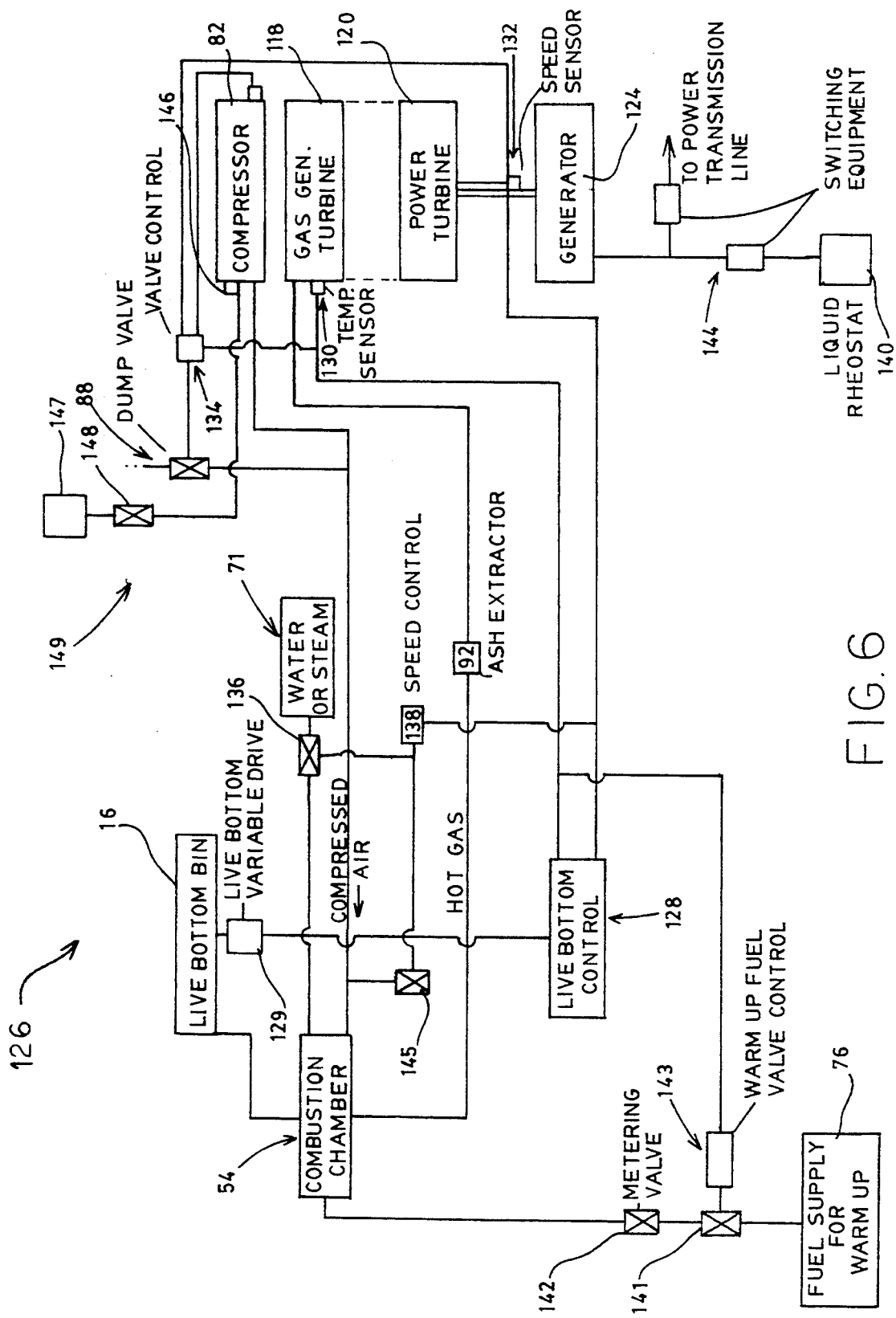
FIG. 6 is a control schematic of the system for burning biomass to fuel a gas turbine.

A central control system 126, as shown in FIG. 6, is incorporated into the system 10 for monitoring and controlling the start up and the self sustained operation of the system 10. Basically, the control system 126 monitors the start up of the system 10, the temperature in the combustion chamber 54, the turbine inlet temperature and the speed of the turbine 116. The controller 126 has various controls to maintain the desired set points.

During start up the combustion chamber 54 is heated by igniting propane gas in the combustion chamber 54 and maintaining the flow of propane via a warm up full valve 141 until the wall of the primary combustor 56 reaches a temperature of 1100° F.–1300° F. The rate of the flow of the propane into the combustion chamber 54 is controlled by the metering valve 142. Once the desired temperature is reached the warm up fuel valve control 143 will shut off the supply of warm up fuel.

Further during the start up, the system requires outside power to power the feeder device 14 and the turbine system 116. A starter apparatus 149 must be utilized to initiate and maintain the rotation of the compressor 82 and turbine 116 until the system 10 can be sustained on biomass fuel alone. In the preferred embodiment, the starter apparatus 149, as shown in FIG. 6, includes a starter motor 146 which is connected to the compressor 82, a pressurized fluid source 147, which fuels the starter motor 146 and a manual valve 148, which controls the pressurized fluid entering the starter motor 146. The pressurized fluid is preferably hydraulic or pneumatic pressure. The starter motor 146 initiates the rotation of the compressor 82 and the turbine 116. The manual valve 148 is closed when the system 10 is sustained on biomass fuel alone.

In an alternate embodiment, for single shaft gas turbines (not shown), the starter apparatus includes an internal combustion engine, an automatic transmission, a belt drive, an overrunning clutch, a disk clutch, and the generator 124. The automatic transmission is needed to ease the load on the engine as it starts the rotation of the generator rotor and gas turbine. When warm up of the system is completed and the power is applied to the generator 124 which is operating as a motor, the overrunning clutch allows the generator 124 and gas turbine 118 to move up in speed without overspeeding the engine before the disk clutch is released. An overspeed trip on the engine ignition circuit is set to prevent overspeeding of the engine as the disk clutch is released. As the gas turbine 118 takes over and drives the generator 124, the generator field is unshorted and the fuel adjusted to achieve synchronous speed. The starter apparatus 149 utilized in the system 10 should also include a synchronism check relay (not shown) which prevents the closing of the generator-to-line high voltage contactor until the phase and frequency of the generator 124 matches that of the outside grid.

Once the self sustained operation of the system is established, the controller 126 monitors various aspects of the system 10. If the temperature in the combustion chamber 54 is beyond a maximum allowable limit, the dump valve control 134 triggers the dump valve 88 to open. This will instantly reduce the pressure in the combustion chamber 54 and slow the burning of fuel to reduce the temperature in the combustion chamber 54.

The live bottom control 128 controls the feed rate live bottom metering bin 16 by controlling the live bottom variable drive 129, which controls the speed of the archimedean screw 17. The feed rate is increased or decreased depending upon the turbine inlet temperature. If the inlet turbine temperature sensor 130 indicates that the inlet temperature is too high the feed rate is reduced to slow the amount of fuel burning in the combustion chamber 54. The feed rate is increased when the turbine inlet temperature falls below an allowable limit.

For systems that feed into a large power grid, such as this system, the generator speed is locked into the grid frequency and is held constant. In this case, the only variable to control is the inlet turbine temperature such that the electrical generator 124 will not overload. But because of a lapse of time between a change in the feed rate and the effects of that change on the inlet turbine temperature independent systems require that other controls must be implemented to handle any changes in the electrical load on the system 10.

The control implemented in the preferred embodiment is a speed control 138. The speed of the turbines 118, 120 is monitored with a speed sensor 132. Depending upon the speed, several different controls are triggered by the speed control 138. When the load on the system is increased, the steam valve control 136 triggers the steam injection head 71 to inject steam into the combustion gases 75 to maintain the speed of the turbines 118, 120.

If the load decreases, the dump valve control 134 triggers the valve 145 to open such that compressor air 86 can be bled gradually from the system 10. When the dump valve 88 is opened, it immediately reduces the pressure in the system 10, the burning of the biomass is slowed and inlet turbine temperature is rapidly reduced.

In an emergency shut down, which occurs when the electrical generator 124 is disconnected from the outside grid, the generator 124 is switched, via switching equipment 144, to a load replacement device which prevents the turbines 118, 120 from overspeeding while allowing the high pressure gases 75 in the system 10 to dissipate. In the preferred embodiment, the load replacement device is a liquid rheostat 140. The liquid rheostat 140 uses electrical energy to dissociate the hydrogen and oxygen in water and can absorb large amounts of power associated with the system 10.

From the foregoing description, it will be recognized by those skilled in the art that a system for burning biomass to fuel a turbine offering advantages over the prior art has been provided. Specifically, the system provides means to control the pressure in the pressurized combustion chamber and means to cool the temperature of the combustion gases exiting the combustion chamber which in effect controls the temperature of the combustion gases entering the turbine. The system also incorporates a non-sticking additive such that the ash of the combustion gases does not adhere to the turbine blades. A flow enhancer is utilized to generate the power required to increase the power of the system. Finally the system described above incorporates a central controller to control various aspects of the system. The controller includes a load replacement device which can absorb the power of the system when not connected to an outside load.

While a preferred embodiment has been shown and described, it will be understood that it is not intended to limit the disclosure, but rather it is intended to cover all modifications and alternate methods falling within the spirit and the scope of the invention as defined in the appended claims and equivalents thereof.

Having thus described the aforementioned invention, I claim:

1. A system for burning biomass particles to fuel a gas turbine comprising:

a turbine having a plurality of blades;

a pressurized combustion chamber including a combustion mechanism for combusting said biomass particles therein, said combustion chamber having at least a primary combustion zone;

a feeder device for feeding said biomass particles into said pressurized combustion chamber;

an air compressor for circulating compressed air into said pressurized combustion chamber via a conduit connecting said air compressor to said pressurized combustion chamber, said air compressor being driven by said turbine, said compressed air facilitating said combustion mechanism to combust said biomass particles and to produce high temperature high pressure combustion gases;

preheating means for preheating said compressed air before said compressed air enters said pressurized combustion chamber;

cooling means for cooling said combustion gases before said combustion gases exit said pressurized combustion chamber;

an injection system for injecting said combustion gases into said turbine to rotate said turbine at a selected rotational speed such that said turbine can drive a load;

an ash extractor for removing ash from said combustion gases before said combustion gases enter said turbine; and a control system for controlling said rotational speed of said turbine, said control system including an inlet turbine temperature controller and a turbine speed controller, said inlet turbine temperature controller including a feeder device controller which controls said feeding of said biomass particles into said pressurized combustion chamber, said turbine speed controller controlling a dump valve, a steam injector and load replacement device, said dump valve for depressurizing said pressurized combustion chamber when said dump valve is opened, said steam injector injecting steam into said combustion gases, said load replacement device for absorbing said load driven by said rotation of said turbine.

2. The system for burning biomass particles to fuel a gas turbine of claim 1 wherein said ash extractor comprises a cyclone filter, a primary ash lock hopper to receive ash from said cyclone filter, a secondary ash lock hopper to receive ash from said primary ash lock hopper, an ash flush valve to permit removal of ash from said secondary ash lock hopper, and an ash bin to receive ash from said secondary ash lock hopper.

3. The system for burning biomass particles to fuel a gas turbine of claim 1 wherein an additive is combined with said biomass such that after combustion ash remaining in said combustion gases delivered to said turbine will not adhere to said plurality of blades of said turbine.

4. The system for burning biomass particles to fuel a gas turbine of claim 1 further including a starter apparatus for initiating and maintaining said rotation of said turbine until a continuous self sustaining operation fueled by burning of said biomass is initialized.

5. The system for burning biomass particles to fuel a gas turbine of claim 4 wherein said starter apparatus includes a fluid powered motor.

6. The system for burning biomass particles to fuel a gas turbine of claim 1 wherein said feeder device includes a plurality of serially staged rotational feeders for continuously feeding a selected amount of said biomass at a selected pressure into said pressurized combustion chamber wherein each of said plurality of serially staged rotational feeders has a successively increasing internal pressure.

7. The system of burning biomass particles to fuel a gas turbine of claim 6 wherein each of said plurality of serially staged rotational feeders includes a cylinder sealed on each side with an endplate, a drive shaft concentrically disposed within said cylinder and a plurality of vanes mounted on said drive shaft, each of said plurality of vanes being equipped with a cylinder contacting seal and a set of endplate contacting seals, each said cylinder contacting seal being biased toward and contacting said cylinder, each of said set of endplate contacting seals being biased toward said set of endplates and mounted on either side of each of said plurality of vanes such that one each of said set of endplate contacting seals contacts one each of said set of endplates, each said cylinder contacting seal and said set of endplate contacting seals being independently biased such that each said cylinder contacting seal and said set of endplate contacting seals moves in an independent manner such that each of said plurality of vanes sealingly contact said cylinder and said endplates, each said cylinder contacting seal overlapping each of said set of endplate contacting seals such that intersections of said cylinder and said endplates are sealed.

8. The system for burning biomass particles to fuel a gas turbine of claim 6 wherein said feeder device further includes a heat isolation rotational feeder which is situated between said pressurized combustion chamber and said plurality of serially staged rotational feeders to protect said plurality of serially staged rotational feeders from high temperatures in said pressurized combustion chamber.

9. A system for burning biomass particles to fuel a gas turbine comprising:

a turbine having a plurality of blades;

a pressurized combustion chamber including a combustion mechanism for combusting said biomass particles therein, said combustion chamber having at least a primary combustion zone;

a feeder device for feeding said biomass particles into said pressurized combustion chamber;

an air compressor for circulating compressed air into said pressurized combustion chamber via a conduit connecting said air compressor to said pressurized combustion chamber, said air compressor being driven by said turbine, said compressed air facilitating said combustion mechanism to combust said biomass particles and to produce high temperature high pressure combustion gases;

preheating means for preheating said compressed air before said compressed air enters said pressurized combustion chamber;

cooling means for cooling said combustion gases before said combustion gases exit said pressurized combustion chamber;

an injection system for injecting said combustion gases into said turbine to rotate said turbine at a selected rotational speed such that said turbine can drive a load;

an ash extractor for removing ash from said combustion gases before said combustion gases enter said turbine, said ash extractor comprising a cyclone filter, a primary ash lock hopper to receive ash from said cyclone filter, a secondary ash lock hopper to receive ash from said primary ash lock hopper, an ash flush valve to permit removal of ash from said secondary ash lock hopper, and an ash bin to receive ash from said secondary ash lock hopper; and, a control system for controlling said rotational speed of said turbine.

10. The system for burning biomass particles to fuel a gas turbine of claim 9 wherein said feeder device further includes a heat isolation rotational feeder which is situated between said pressurized combustion chamber and said plurality of serially staged rotational feeders to protect said plurality of serially staged rotational feeders from high temperatures in said pressurized combustion chamber.

11. The system for burning biomass particles to fuel a gas turbine of claim 9 wherein an additive is combined with said biomass such that after combustion ash remaining in said combustion gases delivered to said turbine will not adhere to said plurality of blades of said turbine.

12. The system for burning biomass particles to fuel a gas turbine of claim 9 wherein said feeder device includes a plurality of serially staged rotational feeders for continuously feeding a selected amount of said biomass at a selected pressure into said pressurized combustion chamber wherein each of said plurality of serially staged rotational feeders has a successively increasing internal pressure.

13. The system of burning biomass particles to fuel a gas turbine of claim 12 wherein each of said plurality of serially staged rotational feeders includes a cylinder sealed on each side with an endplate, a drive shaft concentrically disposed within said cylinder and a plurality of vanes mounted on said drive shaft, each of said plurality of vanes being equipped with a cylinder contacting seal and a set of endplate contacting seals, each said cylinder contacting seal being biased toward and for contacting said cylinder, each of said set of endplate contacting seals being biased toward said set of endplates and mounted on either side of each of said plurality of vanes such that one each of said set of endplate contacting seals contacts one each of said set of endplates, each said cylinder contacting seal and said set of endplate contacting seals being independently biased such that each said cylinder contacting seal and said set of endplate contacting seals moves in an independent manner such that each of said plurality of vanes sealingly contact said cylinder and said endplates, each said cylinder contacting seal overlapping each of said set of endplate contacting seals such that intersections of said cylinder and said endplates are sealed.

14. The system for burning biomass particles to fuel a gas turbine of claim 9 wherein the system further includes a starter apparatus for initiating and maintaining said rotation of said turbine until a continuous self sustaining operation fueled by burning of said biomass is initialized.

15. A system for burning biomass particles to fuel a gas turbine of claim 14 wherein said starter apparatus includes a fluid powered motor.

16. The system for burning biomass particles to fuel a gas turbine of claim 9 wherein said control system includes an inlet turbine temperature controller and a turbine speed controller.

17. The system for burning biomass particles to fuel a gas turbine of claim 16 wherein said inlet turbine temperature controller includes a feeder device controller which controls said feeding of said biomass particles into said combustion chamber.

18. A system for burning biomass particles to fuel a gas turbine of claim 16 wherein said turbine speed controller controls a dump valve for depressurizing said pressurized combustion chamber when said dump valve is opened, a steam injector for injecting steam into said combustion gases and a load replacement device for absorbing said load driven by said rotation of said turbine.

* * * * *